April 15, 1952  W. H. ELLIOT  2,593,280

PHASE-SHIFT CIRCUIT

Filed Dec. 9, 1950

INVENTOR.
William H. Elliot.
BY
ATTORNEY.

Patented Apr. 15, 1952

2,593,280

UNITED STATES PATENT OFFICE 2,593,280

PHASE-SHIFT CIRCUIT

William H. Elliot, Whitefish Bay, Wis., assignor to Cutler-Hammer, Inc., Milwaukee, Wis., a corporation of Delaware Application December 9, 1950, Serial No. 199,963

8 Claims. (Cl. 315—294)

This invention relates to a phase-shift circuit which while not limited thereto is advantageous for control of gaseous discharge tubes.

A primary object of the invention is to provide an adjustable phase-shift circuit capable of producing relatively large changes in phase angle of an output voltage while maintaining the magnitude of such voltage at high values.

Another object is to provide a circuit of the aforementioned character wherein adjustment of the phase angle of the output voltage is primarily a function of the magnitude of an unrectified A. C. voltage, and secondarily a function of the impedance of an inductor in the circuit.

Other objects and advantages of the invention will hereinafter be apparent.

The accompanying drawings illustrate preferred embodiments of the invention which will now be described, it being understood that such embodiments are susceptible of modification in respect of details without departing from the scope of the appended claims.

Figure 1:
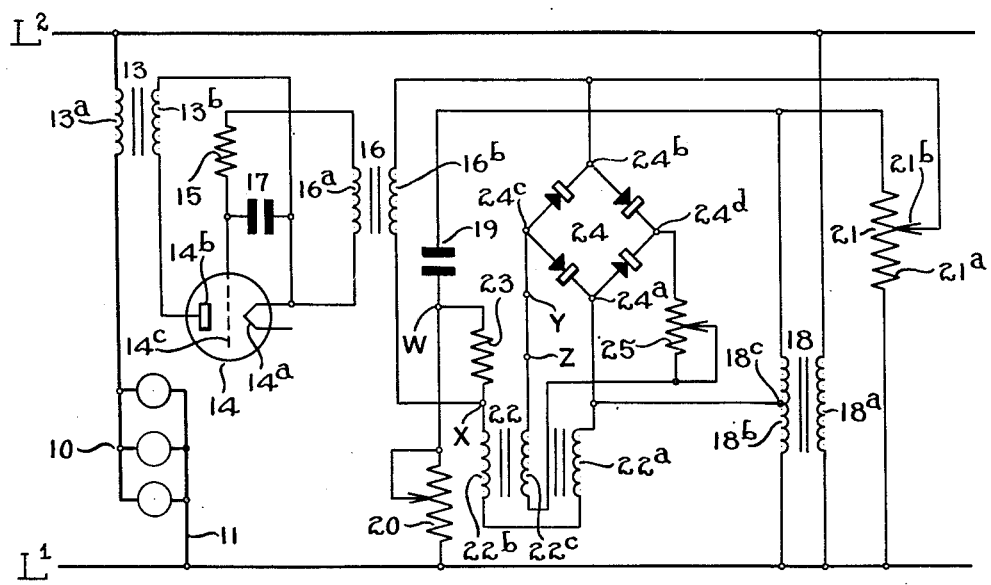
Figure 1 is a diagrammatic showing of a control system for electric lamps embodying the invention.

Referring to Fig. 1, a plurality of electric lamps 10 are connected to a line 11, having connection with a line $L^1$ of a source of single phase alternating current power, and are also connected to a line 12 having connection with line $L^2$ of said source in series with the primary winding 13$^a$ of a transformer 13. Transformer 13 is provided with a secondary winding 13$^b$ which at one end is connected to the cathode 14$^a$ of a gaseous electron discharge tube 14, and which at its other end is connected to the anode 14$^b$ of tube 14. Tube 14 is provided with a control grid 14$^c$ which is connected to the cathode 14$^a$ in series with a resistor 15 and the secondary winding 16$^a$ of a transformer 16. A capacitor 17 is connected directly between grid 14$^c$ and cathode 14$^a$ of tube 14.

As will be understood, the intensity of illumination of the lamps 10 is controllable by variation in impedance of the primary winding 13$^a$ of transformer 13. The impedance of such winding in turn is controlled by variation in the current flow in the secondary winding 13$^b$ as a function of the conduction of tube 14 during its conducting half cycles. The condition of tube 14 is controlled by varying the phase angle of the potential to which a primary winding 16$^b$ of transformer 16 is subjected. The part of the system now to be described comprises a novel form of phase-shift network for adjusting the phase angle of the voltage applied across the winding 16$^b$ of transformer 16.

A transformer 18 has a primary winding 18$^a$ connected across supply lines $L^1$ and $L^2$ and a center-tapped secondary winding 18$^b$ which is connected at one end directly to line $L^1$ and at its other end to line $L^1$ in series with a capacitor 19 and an adjustable resistor 20. The last mentioned end of winding 18$^b$ is also connected to line $L^1$ in series with the resistor element 21$^a$ of an adjustable potential divider 21 which has an adjustable tap 21$^b$. Winding 18$^b$ has connection through its center-tap terminal 18$^c$ to a point W in the connection between capacitor 19 and resistor 20 in series with the A. C. windings 22$^a$ and 22$^b$ of a saturable reactor 22 and a resistor 23. Terminal 18$^c$ of winding 18$^b$ also has connection with input terminal 24$^a$ of a full-wave rectifier 24. The other input terminal 24$^b$ of rectifier 24 is connected to the tap 21$^b$ of potential divider 21 and such terminal 24$^b$ is also connected to a point X in the connection between winding 22$^b$ of reactor 22 and resistor 23, in series with primary winding 16$^b$ of transformer 16.

Reactor 22 is provided with a D. C. control winding 22$^c$ which is connected to the output terminals 24$^c$ and 24$^d$ of rectifier 24 in series with an adjustable resistor 25.

Figure 2:
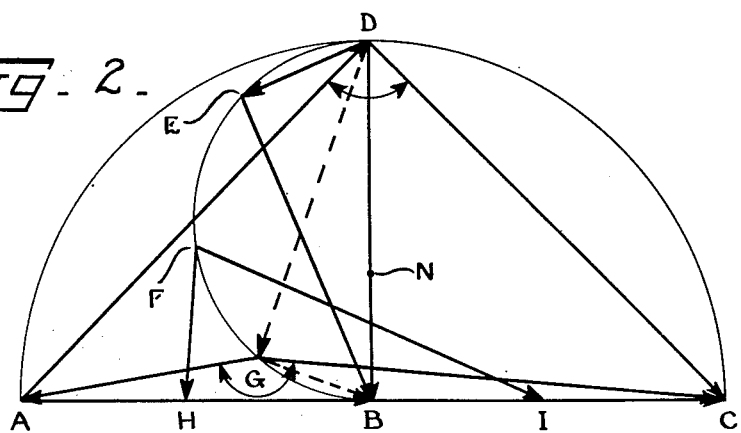
Fig. 2 illustrates in vector form voltage relationships in a part of the system depicted in Fig. 1, and Fig. 3 diagrammatically depicts certain elements that may be incorporated with the system of Fig. 1 to provide a modified form of the same.

Referring to Fig. 2, it shows in vector form the relationship of voltages for the aforedescribed phase-shift network. The vector AC represents the instantaneous alternating voltage from line $L^1$ across the whole of winding 18$^b$ of transformer 18. Vector AB represents the instantaneous voltage between line $L^1$ and terminal 18$^c$ of winding 18. The voltage across resistor 20 is represented by the vector AD and the voltage across capacitor 19 by the vector DC. It will also be apparent that the voltage across the whole of resistor element 21$^a$ of potential divider 21 may also be represented by vector AC and that the voltage from $L^1$ to tap 21$^b$ may be variously represented by vectors AH, AB, AI, etc., depending upon the position of tap 21$^b$ on element 21$^a$.

The elements of the phase-shift circuit thus far described in connection with Fig. 2 comprise a "primary" phase-shift circuit, since the voltage relationships between the point W (point D on Fig. 2), and tap 21$^b$ of potential divider 21 may have any of the magnitudes and directions included between the limits of the vector DA and DC and terminating along the line AHBIC as tap 21$^b$ is changed in position from one end to the other of resistance element 21$^a$ of potential divider 21. It will be apparent that a possible phase-shift range of 90 electrical degrees may be obtained from this "primary" phase shift circuit.

In order to obtain a greater range of phase-shift, it would be possible to connect a potential divider between point W and terminal 18$^c$ of winding 18$^b$ of transformer 18, so that instead of using point D in Fig. 2 as the vertex of possible vectors, some lower point, such as N, could be used. The limits of phase-shift would then be vectors NA to NC (not shown). As point N approaches point B, the possible range of phase-shift would approach 180 electrical degrees. However, such possible connection would be impractical as the magnitude of the voltage across winding $16^b$ of transformer $16$ would drop to very low magnitudes when tap $21^b$ is shifted from either end to the middle of resistor element $21^a$ of potential divider $21$, resulting in loss of control of tube $14$.

In the phase-shift circuit shown and described in connection with Fig. 1, the magnitude of the voltage across winding $16^b$ of transformer $16$ is always of a sufficiently high magnitude to afford control of tube $14$ regardless of the position of tap $21^b$ on resistor element $21^a$. The windings $22^a$ and $22^b$ of reactor $22$ and resistor $23$ connected in series between terminal $18^c$ of winding $18^b$ of transformer $18$ and point W constitute a potential divider of novel form. Varying the position of tap $21^b$ on the resistor element $21^a$ effects a variation in the D. C. exciting current flowing in the control winding $22^c$ of reactor $22$ to thereby effect variation in the impedance of the windings $22^a$ and $22^b$. This exciting current is of maximum value when tap $21^b$ is at either end of the resistance element $21^a$ and is negligible when the tap $21^b$ is close to the midpoint of element $21^c$.

The voltages across the windings $22^a$ and $22^b$, across resistor $23$, and across winding $16^b$ vary in phase angle and magnitude according to the position of tap $21^b$ on resistor element $21^a$. These voltages as ideally depicted vectorially in Fig. 2 have a common vertex which varies in position along a locus described by the semi-circle DEFGB in Fig. 2. When tap $21^b$ is positioned at either end of resistor element $21^a$, the impedance of windings $22^a$ and $22^b$ will be low and the point G on semi-circle DEFGB depicts the vertex of these voltage vectors, with vector DG representing the voltage across resistor $23$, vector GB the voltage across windings $22^a$ and $22^b$ of reactor $22$ and vectors GA and GC representing the voltages across winding $16^b$ of transformer $16$ when the tap $21^b$ is at the lower and upper ends of resistor element $21^a$, respectively. When tap $21^b$ is positioned at the midpoint of resistor element $21^a$, the vertex of the aforementioned voltage vectors will be at point E on semi-circle DEFGB. In the latter instance the vector DE represents the voltage across resistor $23$, and vector EB represents either the voltage across the windings $22^a$ and $22^b$ or the voltage across winding $16^b$ of transformer $16$. Point F on semi-circle DEFGB represents the vertex of the voltage vectors when tap $21^b$ is set at a point intermediate either end of resistor element $21^a$ and the midpoint of the latter. In this instance the vector FH represents the voltage across winding $16^b$ of transformer $16$ with tap $21^b$ at a point intermediate the lower end of resistor element $21^a$ and the midpoint of the latter, and vector FI represents the voltage across winding $16^b$ of transformer $16$ with tap $21^b$ at a corresponding intermediate point between the midpoint of resistor element $21^a$ and the upper end of the latter.

It will be apparent from the foregoing that the range of phase-shift of the voltage across the winding $16^b$ of transformer $16$ obtainable by the phase-shift circuit hereinbefore described is wide and that the magnitude of such voltage is maintained at high values throughout such range of phase shift. Depending upon the constants of capacitor $19$ and resistor $20$ the point D of Fig. 2 can be shifted to any desired position on semi-circle ADC, thereby enabling placement of the locus described by semi-circle DEFGB in a position most favorable to the desired results. In certain applications a quick initial change in phase-shift angle may be desired; in other cases a uniform change might be desired, and in some cases it might be desirable to have a slow initial change and a fast final change. These various phase-shift change characteristics may be readily obtained by appropriate choice of the values for capacitor $19$ and resistor $20$.

Figure 3:
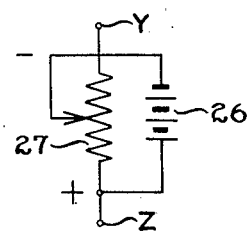

Further variation in phase-shift characteristics may be obtained through modification of the circuit of Fig. 1 by inserting between the points Y and Z in the connection between control winding $22^c$ of reactor $22$ and output terminal $24^c$ of rectifier $24$, the parallel combination of a direct current supply, such as battery $26$, and an adjustable resistor $27$ shown in Fig. 3. Such modification of the circuit of Fig. 1 will afford fast change of the impedance of windings $22^a$ and $22^b$ of reactor $22$ when tap $21^b$ is changed in position along resistor element $21^a$ adjacent the ends of the latter and relatively little change in impedance of such windings when tap $21^b$ is on the middle portion of resistor element $21^a$. It will also be apparent to those skilled in the art that other external signals of appropriate nature might also be applied to control winding $22^c$ of reactor $22$ beside those herein shown and described.

I claim:

1. For supplying and effecting adjustment of the phase angle of a voltage applied to a control circuit, a network for subjection to supply of alternating current comprising an intermediately tapped impedance element, second and third impedance elements having different impedance characteristics with respect to each other connected in series and together in parallel with the first mentioned impedance element, means including fourth and fifth impedance elements having different impedance characteristics with respect to each other in circuit between the tap of said first mentioned impedance element and the connection between said second and third impedance elements, and an adjustable voltage divider, said fourth impedance element having means in circuit with the adjusting element of said voltage divider for effecting variation in its impedance in accordance with the adjustment of said adjusting element.

2. For supplying and effecting adjustment of the phase angle of a voltage applied to a control circuit, a network for subjection to supply of alternating current comprising an intermediately tapped impedance element, second and third impedance elements having different impedance characteristics with respect to each other connected in series and together in parallel with the first mentioned impedance element, a resistor, a saturable reactor having its alternating current windings connected in series with said resistor between the tap of said first mentioned impedance element and the connection between said second and third impedance elements and having a control winding, an adjustable voltage divider, and means in circuit with the adjusting element of said voltage divider and said control winding for supplying the latter with unidirectional energizing current varying in value in accordance with the adjustment of said adjusting element.

3. For supplying and effecting adjustment of the phase angle of a voltage applied to a control circuit, a network for subjection to supply of alternating current comprising an intermediately tapped impedance element, second and third impedance elements having different impedance characteristics with respect to each other connected in series and together in parallel with the first mentioned impedance element, a resistor, a saturable reactor having its alternating current windings connected in series with said resistor between the tap of said first mentioned impedance element and the connection between said second and third impedance elements and having a control winding, an adjustable voltage divider, and means including a rectifying device in circuit with the adjusting element of said voltage divider and said control winding for supplying the latter with unidirectional energizing current varying in value in accordance with the adjustment of said adjusting element.

4. For supplying and effecting adjustment of the phase angle of a voltage applied to a control circuit, a network for subjection to supply of alternating current comprising an intermediately tapped inductance element, a resistor and a capacitor connected in series and together in parallel with said inductance element, a second resistor, a saturable reactor having its alternating current windings connected in series with said second resistor between the tap of said inductance element and the connection between the first mentioned resistor and said capacitor and having a control winding, an adjustable voltage divider, and means including a rectifying device in circuit with the adjusting element of said voltage divider and said control winding for supplying the latter with unidirectional energizing current varying in value in accordance with the adjustment of said adjusting element.

5. For supplying and effecting adjustment of the phase angle of a voltage applied to a control circuit, a network for subjection to supply of alternating current comprising an intermediately tapped inductance element, a resistor and a capacitor connected in series and together in parallel with said inductance element, a second resistor, a saturable reactor having its alternating current windings connected in series with said second resistor between the tap of said inductance element and the connection between the first mentioned resistor and said capacitor and having a control winding, an adjustable voltage divider, and means in circuit with the adjusting element of said voltage divider and the control winding of said reactor including a rectifying device and an adjustable resistor for supplying said control winding with a unidirectional energizing current varying in value in accordance with the adjusting elements of said voltage divider and of said adjustable resistor.

6. For supplying and effecting adjustment of the phase angle of a voltage applied to a control circuit, a network for subjection to supply of alternating current comprising an intermediately tapped inductance element, a resistor and a capacitor connected in series and together in parallel with said inductance element, a second resistor, a saturable reactor having its alternating current windings connected in series with said second resistor between the tap of said inductance element and the connection between the first mentioned resistor and said capacitor and having a control winding, an adjustable voltage divider, and means in circuit with the adjusting element of said voltage divider including a rectifying device, an adjustable resistor and a source of unidirectional voltage connected in parallel with the last mentioned resistor and to said rectifying device in series with said control winding for supplying the latter with unidirectional energizing current varying in value in accordance with the adjustments of the adjusting elements of said voltage divider and of said adjustable resistor.

7. In combination, a source of single phase alternating current, a phase-shift network comprising a transformer supplied from said source and having an intermediately tapped secondary winding, a pair of impedance elements having different impedance characteristics with respect to each other connected in series to one side of said source and together in parallel with said secondary winding, an adjustable voltage divider having its resistance element connected to said one side of said source and in parallel with said secondary winding and means including third and fourth impedance elements having different impedance characteristics with respect to each other in circuit between the tap of said secondary winding and the connection between the first mentioned impedance elements, said third impedance element having means in circuit with the adjusting element of said voltage divider for effecting variation in its impedance in accordance with the adjustment of said adjusting element, and a circuit having a control element connected between said adjusting element and the connection between said third and fourth impedance elements for subjection to the output of said network.

8. In combination, a source of single phase alternating current, a phase-shift network comprising a transformer supplied from said source and having an intermediately tapped secondary winding, a resistor and a capacitor connected in series to one side of said source and together in parallel with said secondary winding, an adjustable voltage divider having its resistor element connected to said one side of said source and in parallel with said secondary winding, a second resistor, a saturable reactor having its alternating current windings connected in series with said second resistor between the tap of said secondary winding and the connector between the first mentioned resistor and said capacitor and having a control winding and means in circuit with the adjusting element of said voltage divider and said control winding for supplying the latter with unidirectional energizing current varying in value in accordance with the adjustment of said adjusting element, and a circuit having a control element connected between said adjusting element and the connection between said second resistor and the alternating current windings of said reactor for subjection to the output of said network.

WILLIAM H. ELLIOT.

REFERENCES CITED

The following references are of record in the file of this patent:

UNITED STATES PATENTS

| Number | Name | Date |
|---|---|---|
| 2,005,893 | Gulliksen | June 25, 1935 |
| 2,030,100 | Dawson | Feb. 11, 1936 |
| 2,054,496 | Craig | Sept. 15, 1936 |